May 29, 1928.
J. W. McADAM
1,671,433
CLOSED AUTOMOBILE BODY
Filed March 25, 1927       2 Sheets-Sheet 1
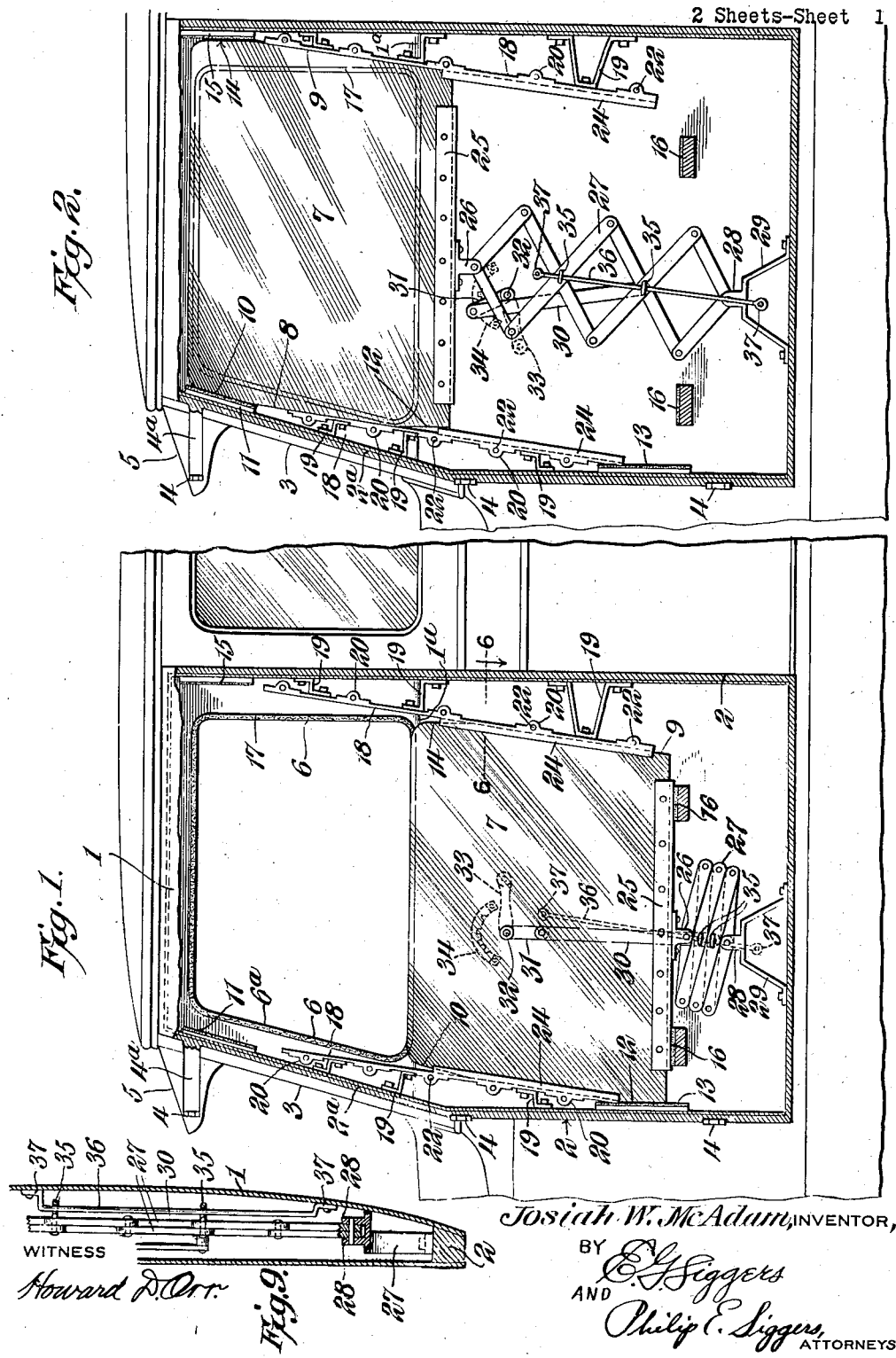
Josiah W. McAdam, INVENTOR,
BY E. G. Siggers
AND Philip E. Siggers,
ATTORNEYS.
WITNESS
Howard D. Orr.

May 29, 1928.
J. W. McADAM
1,671,433
CLOSED AUTOMOBILE BODY
Filed March 25, 1927
2 Sheets-Sheet 2
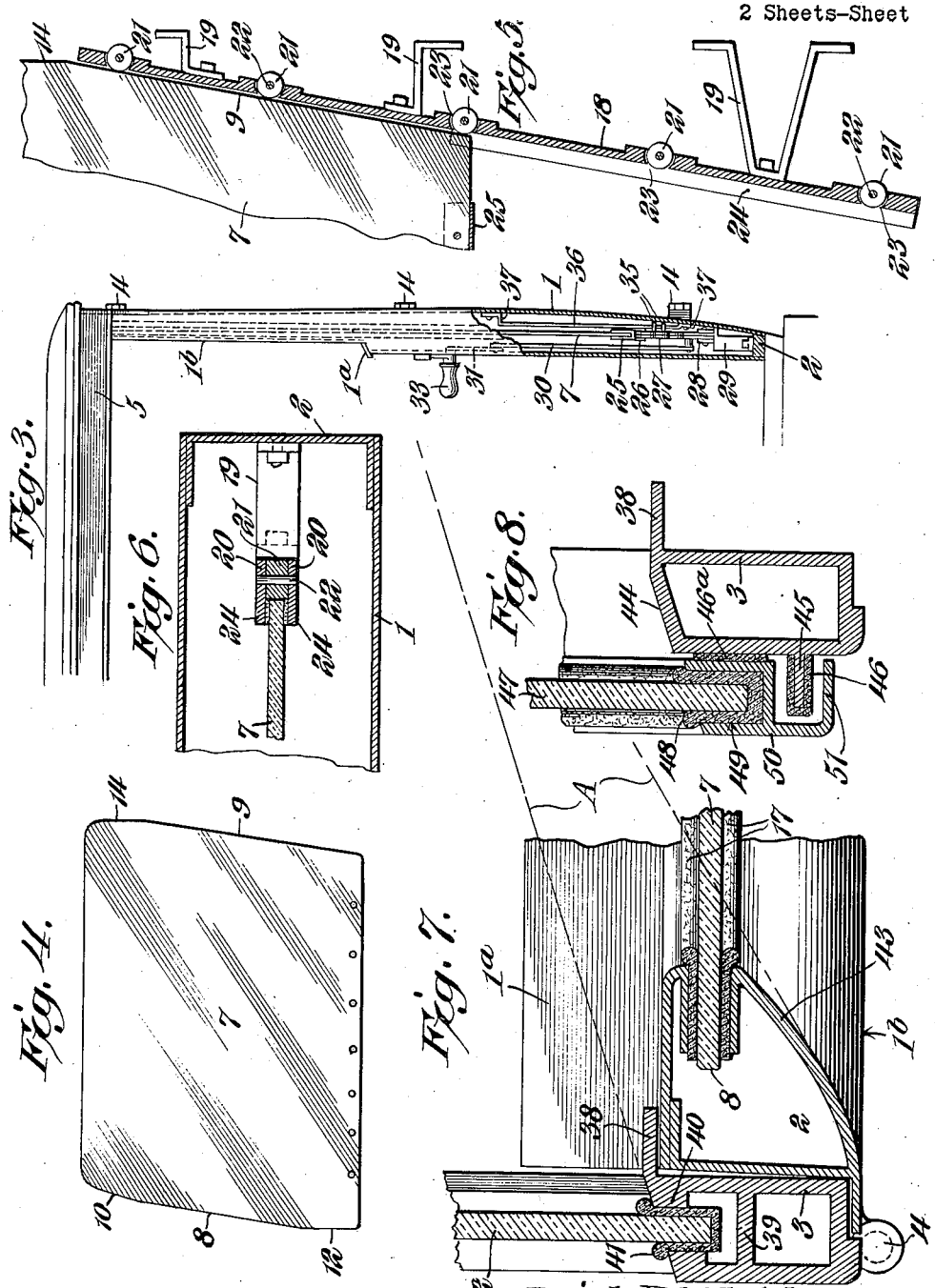
Josiah W. McAdam, INVENTOR,
BY E. G. Siggers
AND Philip E. Siggers,
ATTORNEYS.
WITNESS
Howard D. Ott.

Patented May 29, 1928.

1,671,433

UNITED STATES PATENT OFFICE.

JOSIAH W. McADAM, OF VANCOUVER, BRITISH COLUMBIA, CANADA.

CLOSED AUTOMOBILE BODY.

Application filed March 25, 1927. Serial No. 178,223. REISSUED

This invention relates to improvements in automobile bodies of the inclosed type.

The object is to provide means in the front part of inclosed automobile bodies whereby what is known as the "blind spot" at each front corner of the body is reduced to a minimum, such blind spots being brought about by the more or less bulky arrangement of corner posts and the parts associated therewith to be found in the average automobile and which ordinarily becomes a menace in congested traffic, or while driving at night and in rainy weather.

The present invention also includes the provision of a downwardly and forwardly inclined wind shield which is much desired for the reason that such shields do not reflect the glare of headlights of cars approaching from the rear as well as from the sides, thus removing another menace to driving, and by the provision of such a wind shield, the corner posts of the body, as well as the front wall of the window opening in the front doors are necessarily formed in a similarly inclined position, and said front wall may be located closer to the front edge of the door than usual and suitably rounded so as to offer, in combination with the corner post, the least possible obstruction to the line of vision of the driver of the car.

By the provision of the extremely narrow combination at the front corners of the body and the same being arranged at an incline, it becomes necessary to utilize a peculiarly shaped window to open and close the corresponding shape of the window opening in the front doors, and the invention further contemplates a novel form of plate glass window adapted to be raised and lowered along a path of movement substantially parallel to the aforesaid inclination of the parts and also means to guide the same and to prevent rattling thereof, the means for actuating the window being hidden from view in the structure of the front doors, and readily operable from the front seat of the automobile.

A full and complete understanding of the invention may be obtained from a consideration of the following detailed description, taken in connection with the accompanying drawings forming a part of this specification; it being understood that while the drawings show a practical form of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:

Figure 1 is an elevation of the front part of a closed automobile body showing the improvements applied thereto, the front door being shown in section to clearly show the front door window in its lowered position.

Figure 2 is a similar view showing the window in its raised position.

Figure 3 is a front elevation of one of the front doors partly broken away and showing its relation to the top and floor of the car.

Figure 4 is a detail elevation of the improved window detached.

Figure 5 is a detail sectional view, drawn on an enlarged scale and illustrating the means for guiding the window pane in its up and down movements.

Figure 6 is an enlarged detail sectional view, taken on the line 6—6 of Figure 1.

Figure 7 is a full size horizontal sectional view through the improved corner post and showing the minimum obstruction offered to the vision of the driver.

Figure 8 is a similar view showing a different form of wind shield in connection with the corner post.

Figure 9 is a detail vertical section taken transversely through the lower portion of the door.

Referring to the drawings, there is shown a portion of an automobile body of the inclosed type, in which there is mounted the front door 1, which may be of any of the well-known constructions of either the all-metal or combination form. The door is carried by a surrounding frame 2, said frame being indicated in solid section lining in Figures 1 and 2, to avoid confusion due to the small scale on which they are drawn, though the preferable form of the framing is as shown in Figure 7 of the drawings, wherein suitable sheet metal is stamped or otherwise formed into shape to provide the necessary strength and lightness.

The upper portion of the front edge of the door is inclined rearwardly as indicated at $2^a$ to accord with the rearwardly inclined front corner post 3 of the automobile body and said door is hinged to the body by lower, intermediate and upper hinges 4 in the usual manner, the said upper hinge being joined to the door by an arm 4ª, which permits said hinge to be located on the side of the usual visor 5, which in this instance is preferably formed of metal heavy enough to withstand the strain of assisting in supporting the door when open. The arm 4ª may be set into a suitable indentation formed in the side of the visor, so that all the axes of the hinges may be in the proper alinement with each other, the door, however, may be hinged at its rear edge if desired.

The upper portion of the door, opposite the inclined portion thereof is provided with the usual window opening 6, the front wall 6ª of which is located closer to the adjacent edge of the door than usual, and is inclined to correspond with the inclination thereof so that, by the provision of this narrow portion, in conjunction with the aforesaid narrow corner post, the obstruction to the vision of the driver, and known as the "blind spot" is reduced to a minimum.

A window 7, consisting preferably of a single sheet of heavy plate glass is located in the usual chamber formed between the inner and outer walls of the door, and is adapted to be moved upwardly into closing relation to the window opening and downwardly to open the same. This plate of glass is provided with parallel, horizontal upper and lower edges and with inclined front and rear edges 8 and 9 respectively, as clearly shown in Figure 4 of the drawings. The inclination of the front and rear edges corresponds substantially with the inclination of the said corner posts though slightly more nearly vertical for it will be seen, by reference to Figures 1 and 2, that owing to the above substantial narrowing of the "blind spot," and the slant of the window opening being so close to the edge of the door, there is insufficient room, when the window is lowered, as in Figure 1, to permit said window to be moved up and down in a path exactly parallel with the slope of the corner posts, as the lower front end of the window would strike the vertical front edge of the door frame at the lower portion thereof. For this reason, the window is caused to slide up and down, by means to be described, in a path about half way between the vertical and the angle of the corner posts in order to permit the complete closing of the window opening when the window is elevated.

The front edge 8 of the glass plate is bevelled back at its upper end, as shown at 10, to contact, when fully elevated, with a padded stop 11 located in the upper front corner of the door casing and in like manner the lower front corner of said plate is also bevelled at 12 to contact, when fully lowered, with a similar padded stop 13 secured to the lower vertical portion of the front wall of the door frame. The rear, upper corner of the window is also bevelled at 14 for similar contact with the padded stop 15 located in the rear upper corner of the door frame, and is adapted to function at the same time as the stop 11 when the window is raised.

In addition to the lower front stop 13, the downward movement of the window is checked by a pair of spaced bottom supports 16 arranged transversely of the door chamber and having suitable padding to eliminate all noise and to support the weight of the window when fully lowered, and when the window is fully or partially raised, all movement or noise is guarded against by the usual felt padding 17 arranged around the margins of the window opening in the usual manner.

In order to positively guide the movements of the window pane in the path of movement described, tracks 18 are employed within the chamber in the door, said tracks consisting of suitable metal strips having attaching brackets 19 for the reception of fastening screws which preferably secure the tracks to the inner faces of the front and rear walls of the door. At spaced intervals, the tracks are provided with transversely spaced ears 20 between which there are mounted rollers 21 on pins 22, there being openings 23 formed in the tracks to allow the roller to project slightly through the same to contact with the edges of the window.

It has been found that the above-mentioned marginal padding 17 around the window opening constitutes sufficient means to prevent any lateral movement of the window pane when the latter is elevated, but when the same is lowered into the space below the window opening, such movement is prevented by side flanges 24 formed on the lower portions of the tracks.

Any suitable and convenient means may be employed for raising and lowering the window, but I prefer to employ the means shown in the drawings, though no specific claim is made to the same herein.

The lower edge of the window is provided with a flanged metal strip 25 secured to the same in any desired manner and extending across the major portion of the bottom edge, so as to exert a uniform lift to and prevent breakage of the otherwise unsupported plate of glass.

The strip 25 is provided at its center with a pair of spaced, depending ears 26 to which is attached the upper end of a toggle lever element 27, the lower end of which is similarly connected between ears 28 upstanding from a supporting bracket 29 secured to the bottom frame member of the door.

The toggle lever element is adapted to be actuated in the usual manner for raising and lowering the window by a link 30 connected at its lower end to one of the lower pivotal points of the crossed toggle levers, and said link extends upwardly and is terminally connected to a crank arm 31 located between the inner face of the inner wall of the door and the window. The crank arm 31 is fixed to a rotatable shaft 32 mounted horizontally in the inner wall of the door and having a suitable actuating handle 33 at the inner face of the door and within easy reach of the occupants of the front seat of the automobile. The handle 33 is preferably provided with a suitable pawl connection with a toothed, arcuate rack 34 secured to the inner face of the door and adapted to positively lock the window in its upper or lowermost position or in various intermediate positions.

By the arrangement of the toggle levers, the window may be caused to be fully opened or closed by substantially a half turn of the crank, the power being increased sufficiently to allow of such action to be easily and quickly accomplished, and the window is caused to follow the said inclined path of movement to tightly close and seal the window with the maximum amount of window opening in the upper portion of the door and the minimum amount of obstruction to the vision of the driver by the so-called "blind spot" which has, by the above arrangement of parts, been greatly reduced in area.

One or more of the crossed toggle levers are preferably provided with swivelled eyes 35 located at their points of crossing and said eyes are adapted to slide on a rod 36 arranged at the same angle as the path of movement of the window and secured at its upper and lower ends to the inner face of the outer wall of the door, as indicated at 37. This rod, with which the toggles are thus slidably connected, effectually prevents rattling of the toggles and serves to further eliminate noises.

The front corner posts 3 are provided with rearwardly-extending abutment flanges 38 located at their inner edges for the door to fit against and the width of said corner posts, taken transversely of the automobile, has been greatly reduced so as to allow of a larger wind shield area and reduce the "blind spot" in this direction, as indicated by the dotted lines A representing the lines of vision of the driver, as in Figure 7 of the drawings. This reduction transversely of the automobile necessitates a like reduction in the transverse thickness of the upper portion of the door, said point of reduction being indicated at 1ª in Figure 3, so that the upper portion 1ᵇ of the door is considerably thinner than the lower portion thereof, and the point 1ª is preferably located at the lower line of the window opening, and is in the form of a ledge or sill to conveniently rest the arm of the driver.

In the preferred form of front corner post 3, as indicated at Figure 7, there is an intermediate, vertical wall or web 39 formed therein, and the inner bevelled wall 40 is provided with a continuous, vertical slot in which is suitably held felt padding 41 for a slidable wind shield 42 to move in at the angle of inclination of the front corner posts.

The outer wall 43 of the narrow inclined portion of the door in advance of the window opening is curved on as wide a radius as possible to reduce the "blind spot", as indicated in Figure 7, it being advisable to employ such arcuate form for strength and attractiveness in appearance.

A slightly modified form of front corner post is shown in Figure 8 of the drawings wherein the inner, beveled wall 44 of the same is not slotted, as in Figure 7, and a forwardly-extending flange 45 is provided, the same having a felt facing 46 secured thereto, and a similar felt facing 46ª is secured to the front face of the same post. A hinged wind shield 47, secured in a felt seat 48, mounted in a groove 49 of a wind shield frame 50, is adapted to be swung upwardly and downwardly on overhead hinges (not shown) in a well-known manner and to rest, when closed down, against the said felt strip 46ª for the exclusion of air and moisture, the said frame 50 having an overhanging flange 51 to surround the facing 46 to aid in said exclusion.

From the foregoing it is thought a full and complete understanding of the invention and the merits thereof may be obtained, and it will be seen that by reason of the aforesaid transverse reduction in the width of the door and the reduction to a minimum of that portion of the door in advance of the windw opening, taken longitudinally of the automobile, that the so-called "blind spot" has been greatly reduced, and that novel and efficient means has been provided for causing the window to fully and completely close and seal the window opening, or to open or partially open the same, by moving said window in an angular direction in such necessarily confined space within the chamber of the door.

What is claimed is:

1. An inclosed automobile body having rearwardly inclined front corner posts and wind shield, front doors having window openings, the front edges of said openings corresponding to the inclination of the corner posts, a unitary window pane mounted within each door and having a front edge inclined from top to bottom thereof, and means for sliding the window upwardly and downwardly in a path corresponding substantially to said inclination.

2. An inclosed automobile body having front corner posts of minimum width as viewed from the driver's seat and inclining rearwardly from the hood to the top, front doors having the upper portions of their front edges correspondingly inclined and having upper window openings whose front edges are close to and parallel with said inclination, a plate glass window mounted within each door to be moved upwardly and downwardly to closed and open positions respectively, said window being in the form of a parallelogram having inclined front and rear edges, guiding means engaging said edges to cause the window to move in a path substantially parallel to the corner posts, and toggle levers for actuating the window.

3. An inclosed automobile body having relatively narrow, inclined front corner posts, an inclined anti-glare windshield supported by the corner posts, front doors having their upper front edges correspondingly inclined and hinged along said edges, the upper hinges being secured to the visor, said doors having window openings in their upper portions, provided with correspondingly inclined front edges, tracks mounted within the door in advance and in rear of said openings and arranged substantially at the same angle as the front of the openings, a plate glass window mounted to slide up and down between the tracks, said plate having parallel horizontal upper and lower edges and parallel inclinded front and rear edges to correspond to the tracks, and means for raising and lowering the windows.

4. An inclosed automobile body having relatively narrow inclined front corner posts, an inclined anti-glare windshield supported by the corner posts, front doors having their upper front edges correspondingly inclined and hinged along said edges, the upper hinges being secured to the visor, said doors having window openings in their upper portions provided with correspondingly inclined front edges, tracks mounted within the door in advance and in rear of said openings and arranged substantially at the same angle as the front of the openings, said tracks having spaced openings formed therein, anti-friction rollers mounted in the openings, a plate glass window mounted to slide up and down between the tracks, said window having inclined front and rear edges to contact with the rollers, and a series of toggle levers mounted beneath the window and operable from the inner side of the door to raise and lower the window in a line substantially parallel to the inclined front corner posts.

5. An inclosed automobile body having relatively narrow, inclined front corner posts, an inclined anti-glare windshield supported by the corner posts, front doors having their upper front edges correspondingly inclined and hinged along said edges, the upper hinges being secured to the visor, said doors having window openings in their upper portions provided with correspondingly inclined front edges, tracks mounted within the door in advance and in rear of said openings and arranged substantially at the same angle as the front of the openings, said tracks having spaced openings formed therein, anti-friction rollers mounted in the openings and projecting slightly beyond the inner faces of the tracks, side flanges formed on the lower portions of the tracks, a plate glass window shaped to slide up and down between the sets of rollers, said window being engaged by the side flanges when lowered and by felt padding when raised to prevent rattling, and means operable from the inner side of the door to raise and lower the window.

6. An inclosed automobile body having relatively narrow inclined front corner posts, an inclined anti-glare windshield supported by the corner posts, front doors having their upper front edges correspondingly inclined and hinged along said edges, the upper hinges being secured to the visor, said doors having window openings in their upper portions provided with correspondingly inclined front edges, tracks mounted within the door in advance and in rear of said openings and arranged substantially at the same angle as the front of the openings, said tracks having spaced rollers mounted therein and side flanges on their lower portions, a plate glass window having horizontal upper and lower edges and parallel inclined front and rear edges to contact with said rollers, the upper and lower terminals of the front edge and the upper terminal of the rear edge being bevelled, upper and lower stops mounted in the door to contact with said bevelled terminals to arrest the window in uppermost and lowermost positions, and means for raising and lowering the window in an inclined direction and for holding the same in intermediate positions.

7. In an inclosed automobile body, front corner posts inclining rearwardly from hood to top, said posts being of minimum width as viewed from the driver's seat, front doors having the upper portions of their front edges inclined and having window openings provided with correspondingly inclined front walls located relatively close to the inclined front edges of the doors, the upper portions of the doors from the bottoms of the window openings up being transversely thinner than the lower portions of said doors and the outer edges of said inclined walls being rounded to reduce interference with vision, windows mounted within the doors and having front and rear edges inclined similarly to the corner posts, means for raising or lowering the windows, and means for causing the same to travel in a direction substantially parallel to the inclined front walls of the openings.

8. In an enclosed automobile body, front corner posts inclining rearwardly from hood to top, doors having the upper portions of their front edges and the front walls of their window openings correspondingly inclined, window panes mounted within the doors and having horizontal top and bottom edges and inclined front and rear edges corresponding substantially with the corner posts, guides engaging the front and rear edges to cause the panes to move in said inclined direction, transverse supports arranged in the door beneath the panes to support the same when lowered, a flanged strip carried by the lower edges of the panes to rest on said supports, and manually operated toggle mechanism located beneath the panes and connected to the flanged strips to elevate and lower the panes.

In testimony, that I claim the foregoing as my own, I have hereto affixed my signature.

JOSIAH W. McADAM.